United States Patent
Mozhzherin et al.

(10) Patent No.: US 7,270,704 B2
(45) Date of Patent: Sep. 18, 2007

(54) MIXTURE FOR FABRICATION OF FIREPROOF HIGH-STRENGTH SPHERICAL GRANULES AND THE METHOD OF THEIR MANUFACTURE

(75) Inventors: Vladimir Anatolievich Mozhzherin, Borovichi (RU); Viktor Pavlovich Migal, Borovichi (RU); Vyacheslav Yakovlevich Sakulin, Borovichi (RU); Alexandr Nikolaevich Novikov, Borovichi (RU); Galina Nikolaevna Salagina, Borovichi (RU); Evgeny Arkadievich Schtern, Borovichi (RU); Vladimir Vasilievich Skurikhin, Borovichi (RU); Vyacheslav Vladimirovich Bulin, Borovichi (RU); Lyubov Vladimirovna Mordanova, Borovichi (RU); Boris Abramovich Simanovsky, Moscow (RU); Oleg Mikhailovich Rosanov, St. Petersburg (RU)

(73) Assignee: Otkrytoe Aktsionernoe Obschestvo "Borovichsky Kombinat Ogneuporov", Borovichi, Novgorodskaya Obl. (RU)

( * ) Notice: Subject to any disclaimer, the term of this patent is extended or adjusted under 35 U.S.C. 154(b) by 0 days.

(21) Appl. No.: 11/269,209

(22) Filed: Nov. 8, 2005

(65) Prior Publication Data
US 2006/0058173 A1    Mar. 16, 2006

Related U.S. Application Data

(63) Continuation of application No. PCT/RU03/00210, filed on May 8, 2003.

(51) Int. Cl.
*C04B 14/04* (2006.01)
*B01J 27/16* (2006.01)
*C01B 33/26* (2006.01)
*C01F 7/02* (2006.01)
*C21B 3/02* (2006.01)

(52) U.S. Cl. .......... 106/485; 502/72; 423/118.1; 423/118.2; 423/121; 423/625; 75/313; 75/326

(58) Field of Classification Search ......... 106/485; 502/72; 423/118.1, 121, 625, 118.2; 75/313, 75/326
See application file for complete search history.

(56) References Cited

U.S. PATENT DOCUMENTS

| | | | | |
|---|---|---|---|---|
| 2,865,772 A | * | 12/1958 | Lesar et al. | 501/128 |
| 3,356,514 A | * | 12/1967 | Wishon et al. | 501/128 |
| 4,292,084 A | * | 9/1981 | Thrower et al. | 501/107 |
| 4,427,068 A | | 1/1984 | Fitzgibbon | |
| 4,522,731 A | | 6/1985 | Lunghofer | |
| 4,555,493 A | * | 11/1985 | Watson et al. | 501/127 |
| 4,658,899 A | | 4/1987 | Fitzgibbon | |
| 4,713,203 A | * | 12/1987 | Andrews | 264/681 |
| 4,921,820 A | * | 5/1990 | Rumpf et al. | 501/128 |
| 5,030,603 A | * | 7/1991 | Rumpf et al. | 501/127 |
| 6,372,678 B1 | * | 4/2002 | Youngman et al. | 501/128 |
| 6,881,256 B2 | * | 4/2005 | Orange et al. | 106/644 |

FOREIGN PATENT DOCUMENTS

| | | | |
|---|---|---|---|
| GB | 2 004 266 | * | 3/1979 |
| RU | 2140874 C1 | | 11/1999 |
| RU | 2140875 C1 | | 11/1999 |
| RU | 2211198 C2 | | 3/2003 |

* cited by examiner

*Primary Examiner*—J. A. Lorengo
*Assistant Examiner*—Patricia L. Hailey
(74) *Attorney, Agent, or Firm*—Houston Eliseeva LLP

(57) ABSTRACT

The inventive method for producing refractory high-strength spherical granules consists in separately presintering kaolin and bauxite in a rotational furnace, jointly sintering said components in order to produce a charging material, granulating, drying and screening said charging material, sintering said granules in the rotational furnace and screening the sintered granules. Said sintered kaoline is produced by sintering at a temperature ranging from 1400 to 1500 DEG C so far as a water absorption of 5% is attained for kaoline containing 40-45 mass % and a free quartz in a quantity equal to or greater than 60 mass %. The $Al_2O_3:SiO_2$ ratio in the charging material is equal to 1:1 at the following charging material component ratio: 36-67 mass % sintered kaolin and the rest being sintered bauxite.

19 Claims, No Drawings

MIXTURE FOR FABRICATION OF FIREPROOF HIGH-STRENGTH SPHERICAL GRANULES AND THE METHOD OF THEIR MANUFACTURE

RELATED APPLICATIONS

This application claims priority to PCT application number PCT/RU2003/000210, filed May 8, 2003, which is incorporated herein by reference in its entirety.

FIELD OF THE INVENTION

The invention relates to fabrication of fireproof granular materials designed to be used as a propping agent (prop) during oil and gas production by way of hydraulic fracturing of a shelf.

BACKGROUND OF THE INVENTION

Hydraulic fracturing of the shelf is a process of pumping liquid into given oil and gas bearing underground shelves transverse to a well under pressure and at a rather high speed, in the result of which this shelf collapses and liquid penetrates a formed fissure. To maintain fissures open-ended after removal of rupture pressure a propping agent is added to pumped liquid which penetrating the fissure and filling it up functions as lining. In the result of hydraulic fracturing of the shelf oil and gas recovery factor in the well increases due to an increase in the total shelf area joining with the well, appearance of a larger pressure differential between the oil-bearing stratum and fissure stimulating oil or gas inflow to it, greater permeability of the fissure filled with prop as compared to the permeability of underground oil and gas-bearing rock.

A propping agent is high-strength spherical granules able to endure exposure to high temperature and pressure as well as aggressive environment (acid gases, saline solutions) created in the underground shelves near oil and gas wells.

U.S. Pat. No. 4,068,718 describes a propping agent obtained from sintered bauxite the specific gravity of which is over 3.4 g/cm$^3$. It is stated that this specific gravity is necessary for an agent's particle not to be destructed even with high compressive efforts. However, the described material being rather solid and destruction-proof has great specific gravity which makes it inconvenient in use since it requires application of ruptural liquids with increased viscosity and leads to a low volume concentration of this agent in them. It results in a decrease in the width of a fissure after relief of rupture pressure and an insignificant increase in oil and gas recovery factor in the well.

U.S. Pat. No. 4,427,068 describes a propping agent propping agent with the specific gravity of 2.7-3.4 g/cm$^3$ produced from a mixture of preliminarily fully or partially calcinated diaspore clay and dense nonplastic non-soaking fireproof clay (the so called, flint fireclay) with preliminarily roasted bauxite so that the ratio of alumine to silicon in this mixture constitutes from 9:1 to 1:1. Source materials are reduced to fine particles by dry method, are mixed in an Eirich mixer with powder corn starch. Then water is added to the mixer in the amount sufficient to form spherical compositional granules from powder mixture. The author maintains that the speed of adding water is not important. The granules are dried and baked in the rotating oven. The drawback of this invention is the restrictions of the used for prop fabrication natural aluminosilicate raw material since its use with the aluminum oxide content over 50% is required.

Also a mixture for fabrication of granules is known (RF patent No. 2140875), which contains (wt. %) 70-99.5 of kaolin roasted at 700-900° and 0.5-30% with the content of 30-45 wt. % of Al$_2$O$_3$, and 0.5-30% of an additive from the group of substances or their mixtures: bauxite roasted at 800-1100° C. and unroasted one, baddeleyite, powder zirconium concentrate, alumina dust as the wastes of alumine production. The amount of an additive depends on its nature and chemical content: alumina dust, the wastes of alumine production, containing Al$_2$O$_3$ 99.0-99.5 wt. %, is added in the amount of 5.0-20.0 wt. %; baddeleyite containing ZrO$_2$ 91.0-96.0 wt. %, is added in the amount of 0.5-5.0 wt. %; powder zirconium concentrate containing ZrO$_2$ 60.0-65.0 wt. % is added in the amount of 0.5-10.0 wt. %; roasted at 800-1100° C. and unroasted bauxite containing over 65-75 wt. % is added in the amount of 5.0-30.0%; a mixture from alumina dust and unroasted bauxite in the ratio of 1:2 is added in the amount of 15 wt. %; a mixture of unroasted or roasted at 800-1100° C. bauxite and baddeleyite in the ratio of 1:9 is added in the amount of 10.0 wt. %; a mixture of unroasted bauxite and powder zirconium concentrate in the ratio of 1:4 is added in the amount of 10.0 wt. %; a mixture of alumina dust, bauxite roasted at 800-1100° C. and unroasted one in the ratio of 1:2:1 is added in the amount of 20 wt. %; a mixture of alumina dust and bauxite roasted at 800-1100° C. in the ratio of 1:1 is added in the amount of 10 wt. %.

The drawback of this mixture is the use of rather scarce and costly materials, most of which (baddeleyite, zirconium concentrate, alumina dust) are the products of natural raw material processing. The use of costly raw material increases the product's prime cost. The use of multicomponent mixtures complicates production workflow, requires a large number of intermediate containers, extra dosing equipment which additionally increases a product's prime cost and reduces the reliability of maintenance of the given production flow parameters, and leads to instability of end product characteristics. Addition of zirconium bearing components (baddelayite and powder zirconium concentrate) increases agent's specific gravity and bulk weight. In the result of using kaolin as the main raw material, the agent with the intermediate specific gravity (2.67-2.87 g/cm$^3$) and bulk weight (1.67-1.89 g/cm$^3$) is produced.

An offered mixture for fabrication of high-strength spherical granules allows to remove the said drawbacks and get a light prop with the specific gravity of 2.6-2.8 g/cm$^3$ and bulk weight of 1.58-1.68 g/cm$^3$ preserving its capability to endure exposures to high temperature and pressure as well as aggressive environment in the underground shelves near oil and gas bearing wells.

A method is known according to U.S. Pat. No. 4,921,820 where a preliminarily roasted at the temperature not lower than 900° C. kaolinite clay containing at least 1% of Fe2O3 and less than 2% of free quartz together with amorphous silicon is reduced in a ball crusher to the particles with the average size not smaller than 7 mkm. The mixture of a combined grind is granulated in the mixer, produced granules are dried and roasted.

The drawback of this method is the restrictions of the used natural aluminisilicate raw material since the use of kaolinite clay with the content of less than 1% of Fe$_2$O$_3$ and less than 2% of free quartz is needed. The use of costly amorphous silicon increases the product's prime cost.

The offered manufacturing method of high-strength spherical granules allows to remove these drawbacks.

The above and other features of the invention including various novel details of construction

DESCRIPTION OF THE INVENTION

According to the invention kaolin and bauxite are preliminarily roasted, and for granules fabrication a fine ground product of the combined grind of preliminarily roasted kaolin and bauxite in the ratio, wt. %, is used:
  roasted kaolin 33-67,
  roasted bauxite—the rest
  at that, the ratio of $Al_2O_3$ and $SiO_2$ is not less than 1:1.

Preliminary roasting of the kaolin containing 40-45% of $Al_2O_3$ and not more than 5% of free quartz is implemented at the temperature of 1400-1500° C. to the water absorption not more than 5%. The best result is with kaolin roasting to the water absorption not more than 4%.

The temperature of preliminary roasting of bauxite depends on an $Al_2O_3$ content: 1500-1700° C. (preferably, 1600-1650° C.) to the water absorption not more than 5% with the content of $Al_2O_3$ 60-65%; 1100-1400° C. (preferably, 1250-1300° C.) to the water absorption of 20-35% with the content of $Al_2O_3$ more than 65%.

After preliminary roasting bauxite and kaolin are subject to combined dry fine grind to the particles with the average size smaller than 10 mkm (preferably smaller than 5 mkm). A fine ground product of this combined grind is granulated in an Eirich mixer-granulator, produced granules are dried, sieved for isolation of a desired cut, afterwards it is roasted at the temperature of 1500-1600° C. (preferably, 1550-1600° C.) and the roasted granules are sieved for the second time to get the end product.

Kaolin is sedimentary clay mainly consisting of a kaolinite mineral ($Al_2O_3.2SiO_2.2H_2O$). In the process of kaolinite formation during destruction (efflorescing) of the feldspars evolved from primary (magmatic) rocks as intermediate products of efflorescing satellite minerals are included in the main ones, the major of them being quartz. Besides quartz silicon hydrates (argillite), rutile, zirconium silicate, carbonates (primarily, calcite) are met in kaolin.

Kaolins with a decreased content of quartz are formed in the result of the secondary deposit of kaolinite carried off by water and they are called secondary. Secondary kaolins with the content of free quartz less than 3% (and especially more than 1%) can be encountered extremely rarely.

During kaolin roasting the kaolinite contained in it decomposes with isolation of hydrated water and formation of mullite and free silicon

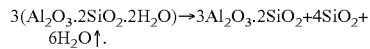

$$3(Al_2O_3.2SiO_2.2H_2O) \rightarrow 3Al_2O_3.2SiO_2 + 4SiO_2 + 6H_2O\uparrow.$$

The free silicon formed in the result of kaolinite decomposition generates silicic glass conglomerating together with other admixtures. Free quartz as a kaolin component dissolves in this silicic glass. The process of quartz crystals dissolving in silicic glass is accelerated by an increase in the temperature of kaolin roasting. Dissolving quartz concentrates silicon component in glass increasing its thermal stability, viscosity, and finally, solidity of the particles of roasted fire clay. That is why roasting of secondary kaolins with the content of $Al_2O_3$ 40-45% and not more than 5% of free quartz is done in rotating ovens at the temperature of 1400-1500° C. The indicator of the roasting process being completed is water absorption of roasted material. With high (more than 5%) value of water absorption the baking process is not completed, free quartz is not fully dissolved in silicic glass and during cooling it transforms from α-form to β-form changing its volume it increases porosity and water absorption of roasted kaolin. Water absorption of less than 5% indicates that all physical and chemical processes: mullite formation, quartz dissolving in glass and its baking are completed in roasted kaolin, that is why kaolin is roasted to the water absorption not more than 5% (preferably, less than 4%) to exclude any further physical and chemical processes in roasted material.

Bauxites are rocks mainly consisting of silicon hydrates, the major of which is gibbsite or argillite $Al_2O_3.3H_2O$, boehmite, and diaspore with a similar chemical formula of $Al_2O_3.H_2O$. Clay forming minerals are most often encountered as satellites, particularly kaolinite as well as free quartz.

When a $Al_2O_3$ content in bauxite is within the range of 60-65% this bauxite contains along with kaolinite admixtures some free quartz that is why roasting is needed at the temperature of 1500-1700° C. (preferably, at 1600-1650° C.) to the water absorption not more than 5% to complete all physical and chemical processes in roasted bauxite: formation of mullite from decomposition products of silicon hydrates and kaolinite, dissolving of quartz in glass and caking. At that, later on the caked material formed in the result of roasting does not undergo any physical or chemical transformations.

When the content of $Al_2O_3$ in bauxite is more than 65% it contains a minimal amount of satellite materials, and a free quartz content is practically zero. The reaction of mullite formation can be stopped and in this case bauxite can be roasted in less severer conditions at a lower temperature of 1100-1400° C. (preferably, 1250-1300° C.) to the water absorption within the range of 20-35%. At that, the reaction of mullite formation, isolation and conglomeration of mullite and corund crystals is transferred to the stage of granules roasting. The mullite and corund crystals forming during granules roasting reinforce its structure giving it additional stability to mechanical loads.

Process implementation is as follows. Source bauxite and kaolin are preliminarily roasted separately in the rotating oven. At that, kaolin is roasted at the temperature of 1400-1500° C. to water absorption not more than 5% (preferably, not less than 4%). Bauxite is roasted depending on the content of aluminum oxide in it, at 1250-1300° C. to water absorption of 20-35% (wt. % of $Al_2O_3$ more than 65%) or at 1600-1650° C. to water absorption not more than 5% (wt. % of $Al_2O_3$ within the range of 60-65%). Then roasted kaolin and bauxite are exposed to fine combined grind in a tubular, vibrating or any other mill ensuring a given grade (the average size of particles is smaller than 10 mkm, preferably, smaller than 5 mkm) in the following ratio, wt. %:
  Roasted kaolin—33-67;
  roasted bauxite—the rest.

The product of a combined grind is granulated in the Einrich mixer-granulator, produced granules are dried and afterwards sieved to isolate a desired cut which is roasted at the temperature of 1500-1700° C. (preferably, 1550-1600° C.). Roasted granules are sieved for the second time to isolate an end product.

The composition of the used ingredients is presented in table 1.

TABLE 1

Chemical composition of the ingredients.

| Material name | Wt. fraction, % | | | | |
|---|---|---|---|---|---|
| | $Al_2O_3$ | $Fe_2O_3$ | $TiO_2$ | Free quartz | Percent of manufacturing losses. |
| Kaolin | 40.1 | 2.34 | 1.95 | 4.97 | 12.9 |
| Kaolin | 44.7 | 1.25 | 1.35 | 3.04 | 14.4 |
| Bauxite | 60.0 | 2.32 | 3.62 | — | 21.8 |
| Bauxite | 64.1 | 2.01 | 3.80 | — | 18.9 |
| Bauxite | 70.2 | 2.25 | 3.80 | — | 20.4 |

EXAMPLE 1

The kaolin containing 40 wt. % of $Al_2O_3$ and about 5% of free quartz, roasted at the temperature of 1400° C. to water absorption of 5%, and bauxite containing 60 wt. % of $Al_2O_3$ roasted at the temperature of 1600° C. to water absorption of 5% is exposed to fine combined grind in the following ratio, wt. %:

| Roasted kaolin | -50; |
|---|---|
| Roasted bauxite | -50. |

The product of a combined grind is granulated in the Eirich mixer-granulator, produced granules are dried and afterwards sieved to isolate the desired cut of 0.4-0.8 mm, which is then roasted at the temperature of 1500-1600° C. (preferably, 1550-1600° C.). Roasted granules are sieved for the second time to isolate an end product.

The properties of roasted spherical granules are shown in table 2.

EXAMPLE 2

The composition of the raw material differs from Example 1 only by the ingredients ratio, wt. %:

| Roasted kaolin | -60; |
|---|---|
| Roasted bauxite | -40. |

EXAMPLE 3

The composition of the raw material differs from Example 1 only by the ingredients ratio:

| Roasted kaolin | -67; |
|---|---|
| Roasted bauxite | -33. |

EXAMPLE 4

The composition of the raw material differs from Example 1 only by the ingredients ratio:

| Roasted kaolin | -33; |
|---|---|
| Roasted bauxite | -67. |

EXAMPLE 5

The composition of the raw material differs from Example 1 only by the ingredients ratio:

| Roasted kaolin | -40; |
|---|---|
| Roasted bauxite | -60. |

EXAMPLE 6

The composition of the raw material differs from Example 1 by the fact of kaolin containing 45% of $Al_2O_3$ and about 3% of free quartz and it being roasted at the temperature of 1500° C. to water absorption of 4%.

EXAMPLE 7

The composition of the raw material differs from Example 6 only by the ingredients ratio:

| Roasted kaolin | -60; |
|---|---|
| Roasted bauxite | -40. |

EXAMPLE 8

The composition of the raw material differs from Example 6 only by the ingredients ratio:

| Roasted kaolin | -67; |
|---|---|
| Roasted bauxite | -33. |

EXAMPLE 9

The composition of the raw material differs from Example 6 only by the ingredients ratio

| Roast kaolin | -33; |
|---|---|
| Roast bauxite | -67. |

EXAMPLE 10

The composition of the raw material differs from Example 6 only by the ingredients ratio:

| Roasted kaolin | -40; |
|---|---|
| Roasted bauxite | -60. |

EXAMPLE 11

The composition of the raw material differs from Example 1 only by the fact of bauxite containing 65% of $Al_2O_3$ and it being roasted at the temperature of 1650° C. to water absorption of 5%.

EXAMPLE 12

The composition of the raw material differs from Example 11 only by the ingredients ratio:

| | |
|---|---|
| Roasted kaolin | -60; |
| Roasted bauxite | -40. |

EXAMPLE 13

The composition of the raw material differs from Example 11 only by the ingredients ratio:

| | |
|---|---|
| Roasted kaolin | -67; |
| Roasted bauxite | -33. |

EXAMPLE 14

The composition of the raw material differs from Example 11 only by the ingredients ratio:

| | |
|---|---|
| Roasted kaolin | -33; |
| Roasted bauxite | -67. |

EXAMPLE 15

The composition of the raw material differs from Example 11 only by the ingredients ratio:

| | |
|---|---|
| Roasted kaolin | -40; |
| Roasted bauxite | -60. |

EXAMPLE 16

The composition of the raw material differs from Example 1 only by the fact of kaolin containing 45% of $Al_2O_3$ and about 3% of free quartz and it being roasted at the temperature of 1500° C. to water absorption of 4%.

EXAMPLE 17

The composition of the raw material differs from Example 16 only by the ingredients ratio:

| | |
|---|---|
| Roasted kaolin | -60; |
| Roasted bauxite | -40. |

EXAMPLE 18

The composition of the raw material differs from Example 16 only by the ingredients ratio:

| | |
|---|---|
| Roasted kaolin | -67; |
| Roasted bauxite | -33. |

EXAMPLE 19

The composition of the raw material differs from Example 16 only by the ingredients ratio:

| | |
|---|---|
| Roasted kaolin | -33; |
| Roasted bauxite | -67. |

EXAMPLE 20

The composition of the raw material differs from Example 16 only by the ingredients ratio:

| | |
|---|---|
| Roasted kaolin | -40; |
| Roasted bauxite | -60. |

EXAMPLE 21

The composition of the raw material differs from Example 1 only by the fact of bauxite containing 70% of $Al_2O_3$ and it being roasted at the temperature of 1300° C. to water absorption of 20%.

EXAMPLE 22

The composition of the raw material differs from Example 21 only by the ingredients ratio:

| | |
|---|---|
| Roasted kaolin | -60; |
| Roasted bauxite | -40. |

EXAMPLE 23

The composition of the raw material differs from Example 21 only by the ingredients ratio:

| | |
|---|---|
| Roasted kaolin | -67; |
| Roasted bauxite | -33. |

EXAMPLE 24

The composition of the raw material differs from Example 21 only by the ingredients ratio:

| Roasted kaolin | -33; |
|---|---|
| Roasted bauxite | -67. |

EXAMPLE 25

The composition of the raw material differs from Example 21 only by the ingredients ratio:

| Roasted kaolin | -40; |
|---|---|
| Roasted bauxite | -60. |

EXAMPLE 26

The composition of the raw material differs from Example 21 only by the fact of kaolin containing 45% of $Al_2O_3$ and about 3% of free quartz and it being roasted at the temperature of 1500° C. to water absorption of 4%.

EXAMPLE 27

The composition of the raw material differs from Example 26 only by the ingredients ratio:

| Roasted kaolin | -60; |
|---|---|
| Roasted bauxite | -40. |

EXAMPLE 28

The composition of the raw material differs from Example 26 only by the ingredients ratio:

| Roasted kaolin | -67; |
|---|---|
| Roasted bauxite | -33. |

EXAMPLE 29

The composition of the raw material differs from Example 26 only by the ingredients ratio:

| Roasted kaolin | -33; |
|---|---|
| Roasted bauxite | -67. |

EXAMPLE 30

The composition of the raw material differs from Example 26 only by the ingredients ratio:

| Roasted kaolin | -40; |
|---|---|
| Roasted bauxite | -60 |

TABLE 2

Properties of produced granules.

| Experiment No. | Number of destroyed particles at the pressure of 69 MPa, wt. % Fraction 0.85–1.18 mm | Fraction 0.425–0.85 mm | Density, g/cm3 Bulk weight | True density | Round | Sphericity |
|---|---|---|---|---|---|---|
| 1 | 25.6 | 10.8 | 1.61 | 2.66 | 0.9 | 0.9 |
| 2 | 26.3 | 11.2 | 1.59 | 2.64 | 0.9 | 0.8 |
| 3 | 27.2 | 11.9 | 1.58 | 2.62 | 0.8 | 0.9 |
| 4 | 25.0 | 10.0 | 1.66 | 2.70 | 0.9 | 0.9 |
| 5 | 25.2 | 10.4 | 1.64 | 2.69 | 0.8 | 0.9 |
| 6 | 25.2 | 10.2 | 1.62 | 2.67 | 0.8 | 0.9 |
| 7 | 25.7 | 10.8 | 1.60 | 2.65 | 0.9 | 0.8 |
| 8 | 26.2 | 11.4 | 1.59 | 2.64 | 0.8 | 0.9 |
| 9 | 25.0 | 10.0 | 1.66 | 2.71 | 0.9 | 0.8 |
| 10 | 24.6 | 10.4 | 1.62 | 2.68 | 0.8 | 0.9 |
| 11 | 25.2 | 10.0 | 1.62 | 2.66 | 0.8 | 0.9 |
| 12 | 26.7 | 11.8 | 1.60 | 2.66 | 0.9 | 0.8 |
| 13 | 23.2 | 12.4 | 1.59 | 2.64 | 0.8 | 0.9 |
| 14 | 24.0 | 9.6 | 1.66 | 2.72 | 0.9 | 0.8 |
| 15 | 25.0 | 9.8 | 1.68 | 2.79 | 0.8 | 0.9 |
| 16 | 23.8 | 9.8 | 1.60 | 2.72 | 0.8 | 0.9 |
| 17 | 25.2 | 9.8 | 1.59 | 2.64 | 0.9 | 0.8 |
| 18 | 26.3 | 11.4 | 1.58 | 2.58 | 0.8 | 0.9 |
| 19 | 22.0 | 11.6 | 1.68 | 2.78 | 0.9 | 0.8 |
| 20 | 22.8 | 9.6 | 1.65 | 2.72 | 0.8 | 0.9 |
| 21 | 23.4 | 9.7 | 1.66 | 2.74 | 0.8 | 0.9 |
| 22 | 26.7 | 10.8 | 1.65 | 2.71 | 0.9 | 0.8 |
| 23 | 27.9 | 11.4 | 1.62 | 2.68 | 0.8 | 0.9 |
| 24 | 24.0 | 9.4 | 1.68 | 2.79 | 0.9 | 0.8 |
| 25 | 24.8 | 9.6 | 1.66 | 2.73 | 0.8 | 0.9 |
| 26 | 22.4 | 8.9 | 1.65 | 2.71 | 0.8 | 0.9 |
| 27 | 25.7 | 9.8 | 1.63 | 2.68 | 0.9 | 0.9 |
| 28 | 26.9 | 10.0 | 1.61 | 2.64 | 0.8 | 0.9 |
| 29 | 24.0 | 8.6 | 1.68 | 2.78 | 0.9 | 0.8 |
| 30 | 24.8 | 8.8 | 1.67 | 2.76 | 0.8 | 0.9 |

While this invention has been particularly shown and described with references to preferred embodiments thereof, it will be understood by those skilled in the art that various changes in form and details may be made therein without departing from the scope of the invention encompassed by the appended claims.

What is claimed is:

1. An aluminosilicate mixture for fabricating fireproof, high-strength granules, the mixture consisting essentially of:
    a product of a combined grind of preliminarily roasted kaolin and bauxite, wherein:
    the preliminary roasted kaolin to a water absorption of no more than 5% is present in the mixture in an amount of 33-67 wt. % and is produced by roasting a kaolin containing $Al_2O_3$ in an amount of 40-45 wt. % and free quartz in an amount that is no more than 5 wt. %, at a temperature in the range of from 1400° C. to 1500° C., the balance of the mixture being the preliminary roasted bauxite, produced by roasting a bauxite at a temperature higher than 1100° C., and wherein the mixture contains no less than 50 wt. % of $Al_2O_3$.

2. The mixture of claim 1, wherein the preliminary roasted bauxite to a water absorption of no more than 5% is produced by roasting a bauxite that contains 60-65 wt. % of $Al_2O_3$ at a temperature within the range of from 1500° C. to 1700° C.

3. The mixture of claim 2, wherein the preliminary roasted bauxite is produced by roasting the bauxite at a temperature in the range of from 1600° C. to 1650° C.

4. The mixture of claim 1, wherein the preliminary roasted bauxite is produced to a water absorption in the range of from 20 to 35% by roasting a bauxite that contains more than 65 wt. % of $Al_2O_3$, at a temperature within the range of from 1100° C. to 1400° C.

5. The mixture of claim 4, wherein the preliminary roasted bauxite is produced by roasting the bauxite at a temperature in the range of 1250° C. to 1300° C.

6. A propping composition containing fireproof, high strength granules fabricated by roasting the product of the combined grind of claim 1.

7. Fireproof, high-strength spherical granules manufactured by drying, sieving and roasting, at a temperature in the range of from 1500° C. to 1700° C. the product of the combined grind of claim 1.

8. A method for producing fireproof, high-strength essentially spherical granules, the method comprising:
   a. mixture granulating preliminary roasted kaolin to a water absorption of no more than 5%, prepared by roasting a kaolin containing $Al_2O_3$ in an amount of 40-45 wt. % and free quartz in an amount of no more than 5 wt. %, at a temperature in the range of from 1400° C. to 1500° C. and preliminary roasted bauxite, prepared by roasting a bauxite at a temperature higher than 1100° C., wherein the mixture has no less than 50 wt. % of $Al_2O_3$, and includes 33-67 wt. % roasted kaolin, the balance of the mixture being roasted bauxite, to form granules;
   b. drying the granules to form dried granules;
   c. sieving the dried granules to obtaine a cut of the dried granules; and
   d. roasting the cut of dried granules at a temperature in the range of from 1500° C. to 1700° C., to produce the fireproof, high-strength essentially spherical granules.

9. The method of claim 8, wherein the preliminary roasted bauxite to a water absorption of no more than 5% is prepared by roasting a bauxite that contains 60-65 wt. % of $Al_2O_3$ at a temperature in the range of from 1500° C. to 1700° C.

10. The method of claim 9, wherein the preliminary roasted bauxite is prepared by roasting the bauxite at a temperature in the range of from 1600° C. to 1650° C.

11. The method of claim 8, wherein the preliminary roasted bauxite to a water absorption in the range of from 20 to 35% is prepared by roasting a bauxite that contains more than 65 wt. % of $Al_2O_3$, at a temperature within the range of from 1100° C. to 1400° C.

12. The method of claim 11, wherein the preliminary roasted bauxite is prepared by roasting the bauxite at a temperature in the range of 1250° C. to 1300° C.

13. Fireproof, high-strength, essentially spherical granules produced by the method of claim 8.

14. Granules consisting of a roasted aluminosilicate mixture, obtained by roasting at a temperature in the range of 1500° C. to 1700° C. an aluminosilicate mixture containing no less than 50 wt. % of $Al_2O_3$ and including 33-67 wt. % of preliminary roasted kaolin to a water absorption of no more tan 5% obtained by roasting, at a temperature in the range of from 1400° C. to 1500° C., a kaolin containing $Al_2O_3$ in an amount of 40-45 wt. % and free quartz in an amount that is no more than 5 wt. %, the balance of the mixture being roasted bauxite, obtained by roasting bauxite at a temperature higher than 1100° C.

15. The granules of claim 14, wherein the preliminary roasted bauxite to a water absorption of no more than 5% is obtained by roasting a bauxite that contains 60-65 wt. % of $Al_2O_3$ at a temperature within the range of from 1500° C. to 1700° C.

16. The granules of claim 15, wherein the preliminary roasted bauxite is obtained by roasting the bauxite at a temperature in the range of from 1600° C. to 1650° C.

17. The granules of claim 14, wherein the preliminary roasted bauxite to a water absorption in the range of from 20 to 35% is obtained by roasting a bauxite that contains more than 65 wt. % of $Al_2O_3$, at a temperature within the range of from 1100° C. to 1400° C.

18. The granules of claim 17, wherein the preliminary roasted bauxite is obtained by roasting the bauxite at a temperature in the range of 1250° C. to 1300° C.

19. A propping composition containing the granules of claim 14.

* * * * *